(12) United States Patent
Hokkanen et al.

(10) Patent No.: US 6,993,666 B1
(45) Date of Patent: Jan. 31, 2006

(54) METHOD AND APPARATUS FOR REMOTELY ACCESSING A PASSWORD-PROTECTED SERVICE IN A DATA COMMUNICATION SYSTEM

(75) Inventors: Tuomo Hokkanen, Helsinki (FI); Janne Linkola, Helsinki (FI)

(73) Assignee: Sonera Oyj, Helsinki (FI)

( * ) Notice: Subject to any disclaimer, the term of this patent is extended or adjusted under 35 U.S.C. 154(b) by 0 days.

(21) Appl. No.: 09/513,704

(22) Filed: Feb. 25, 2000

(30) Foreign Application Priority Data

Aug. 27, 1997 (FI) ..................................... 973528
Aug. 25, 1998 (WO) ....................... PCT/FI98/00653

(51) Int. Cl.
*H04L 9/32* (2006.01)

(52) U.S. Cl. ..................................... 713/202; 713/155
(58) Field of Classification Search ................ 713/202, 713/200, 183, 155
See application file for complete search history.

(56) References Cited

U.S. PATENT DOCUMENTS

| | | | | |
|---|---|---|---|---|
| 5,732,137 A | * | 3/1998 | Aziz ........................... | 713/155 |
| 5,812,764 A | * | 9/1998 | Heinz, Sr. .................... | 713/202 |
| 6,006,333 A | * | 12/1999 | Nielsen ....................... | 713/202 |
| 6,112,078 A | * | 8/2000 | Sormunen et al. ........... | 455/411 |
| 6,223,292 B1 | * | 4/2001 | Dean et al. .................. | 713/202 |

FOREIGN PATENT DOCUMENTS

| | | |
|---|---|---|
| EP | 0 768 595 | 4/1997 |
| FI | 960 820 | 8/1997 |
| WO | WO 93/09621 | 5/1993 |
| WO | WO 95/10823 | 4/1995 |
| WO | WO 96/00485 | 1/1996 |
| WO | WO 97/31306 | 8/1997 |

OTHER PUBLICATIONS

US 5,373,559, 12/1994, Kaufman (withdrawn)

* cited by examiner

*Primary Examiner*—Gregory Morse
*Assistant Examiner*—Andrew L. Nalven
(74) *Attorney, Agent, or Firm*—Cohen, Pontani, Lieberman & Pavane

(57) ABSTRACT

A procedure and a data communication system in which a service provider provides to a remote user of a service a set of expendable passwords for use by the user in accessing the service via a telecommunication and/or data network. The user's terminal device is provided with means for automatically transmitting a password at log-on to the service, and a server to which the terminal device sets up a connection includes means for identifying the password and for allowing or denying access to the service on the basis of the supplied password. The terminal device further includes means for storing a set of passwords and for selecting, at log-on to a predetermined service, the correct password from the stored set of passwords for automatic addition of the password to a connection setup signal transmitted from the terminal device to the server.

9 Claims, No Drawings

METHOD AND APPARATUS FOR REMOTELY ACCESSING A PASSWORD-PROTECTED SERVICE IN A DATA COMMUNICATION SYSTEM

BACKGROUND OF THE INVENTION

1. Field of the Invention

The present invention relates to a method and arrangement for remotely accessing password-protected services in a data communication system.

2. Description of Related Art

Reliable identification of the user is an essential prerequisite for permitting access to many services, such for example as bank services, that are commonly provided in a general telecommunication network or other data network. Because the use and consequences of use of such services may involve significant economic ramifications, it is essential that the service provider be able to ascertain and validate a user's identity, and/or the user's right to access and use the service, before making the service available to that user.

Very often, e.g. in conjunction with bank services, the identification of the user is effected and confirmed by means of passwords, and often these passwords are expendable. In commonly-used arrangements, the service provider or an identifying party authorized by the service provider has given the user beforehand a number of single-use passwords (e.g. four-digit numbers), one of which the customer uses each time he or she needs to access or use the service. When the previously-provided list of passwords is or is about to be exhausted, the service provider (or a party authorized by the service provider) sends the user a new list of passwords. In this manner, the user always has a sufficient number of passwords on hand to satisfy his or her near-future needs.

A feature typical of prior-art solutions is that the user or customer is required to manually input an expendable password when logging on to the bank's or service-provider's server. Often the password is entered by selectively depressing the keys of a telephone set, thereby causing the data to be transmitted to the server using tone frequency transmissions employing the so-called DTMF (dual tone multifrequency) codes. In addition, there are many other methods for transmitting a password, such as the short-message service available in GSM (Global System for Mobile Communications) networks; as used herein, the term GSM network is intended to refer to any mobile communication system based on the GSM specifications. In any event, the essential point is that the user is required to manually input the password which is time consuming and, in many cases, may be quite difficult for the user.

Another feature typical of prior art solutions is that the service provider must from time to time provide the user with a new set of passwords by using a relatively unreliable transmission mechanism, most commonly by mail. In such situations the letter containing the passwords may end up in the wrong hands, thus compromising security.

OBJECTS AND SUMMARY OF THE INVENTION

It is accordingly the desideratum of the present invention to overcome the problems and difficulties inherent in prior art systems and practices as described hereinabove.

It is a specific object of the invention to provide a completely new procedure and system for effecting the transmission of passwords between a user's telephone apparatus and a service-provider's server.

A further object of the invention is to facilitate the use of remotely-accessible services that require passwords by reducing the number of routines that necessitate user interaction to attain access to and use the services without compromising the safety and security of the services.

The procedure of the invention for accessing a service in a data communication system is intended for use in systems in which the service provider provides to the user of a service a number of expendable passwords by means of which the user can access the service via a telecommunication and/or data network, a connection is set up from a terminal device to a server and a password is sent or supplied to the server at log-on to the service, the password is identified and verified by the server, and access to the service is then allowed or denied based on the supplied password.

In accordance with the inventive procedure, a set of passwords is stored in the terminal device, the proper or appropriate password is selected from the stored set of passwords at log-on to a predetermined service, and the selected password is automatically added to a connection setup signal or string for transmission from the terminal device to the server.

Correspondingly, in the inventive system, the terminal device comprises means for storing a set of passwords and for selecting the proper or appropriate password from the stored set of passwords at log-on to a predetermined service for automatic addition of the password to a connection setup signal or string which is then transmitted from the terminal device to the server.

The present invention advantageously provides a completely new type of mechanism for the transmission of passwords between a user's terminal—such as a telephone set or device or apparatus—and a server of the application or service provider. A further advantage of the invention is that it facilitates access to and use of services that require passwords for access by reducing the number of routines that necessitate user interaction in conjunction with attaining access to and use of the services. This is accomplished without any compromise in the safety or security of the services.

In one or various embodiments of the inventive procedure, a number of features are or may be implemented. For example, used passwords from the stored set of passwords may be registered or recorded. In addition, the set of passwords in the terminal device may be updated from the server via the telecommunication and/or data network. Furthermore, an order or request for a new set of passwords may be automatically sent to the server from the terminal device when the previous set of passwords has been exhausted. It is also contemplated that several sets of passwords corresponding to the different services may be stored in the terminal device and, during or in connection with setup, the particular set of passwords corresponding to and for use with each service to be accessed is automatically selected.

Similarly, a number of features are intended for implementation in one or more embodiments of the inventive system. Thus, the terminal device may include or comprise means for registering or recording those of the passwords in a set of passwords that have already been used. The server may comprise means for updating the set of passwords in the terminal device via the telecommunication and/or data network, and the terminal device may comprise means for receiving a set of passwords from the server or other remote source via the network. The terminal device may additionally comprise means for automatic ordering, via the network, of a new set of passwords from the server when the previous or existing stored set of passwords has been exhausted.

The terminal device may also comprise means for storing several sets of passwords each corresponding to or for use with one of a plurality of different services accessible by the user, and it may furthermore comprise means for automatically selecting the appropriate particular set of passwords corresponding to or for use with each specific service to be accessed or used.

In the practice of the invention, the data communication system may comprise a wired network and the terminal device a telecommunication terminal, such as a telephone, in the wired network. In some embodiments of the system, the data communication system comprises a mobile communication network, such as a GSM network, and the terminal device is a mobile station, such as a GSM telephone. Where the terminal device is a GSM telephone, the means for implementing and utilizing the password management functions may be disposed in a subscriber identity module, such as a SIM card, in the form of programming or software operable to perform the intended operations and functionality.

In the same or other embodiments of the inventive system, the transmission of passwords in the connection setup between the subscriber identity module and the service may be effected by making use of the subscriber number. The software of the subscriber identity module may be designed to identify the service on the basis of its identifier data, such as the telephone number used to access the service, and to add or append a predetermined number of additional digits forming or providing the appropriate password to the end of the telephone number of the service during call setup. The subscriber identity module may furthermore be provided with or store a service directory containing information specifying the services, the service identifier data and the names of the password files to be used in conjunction with the particular services. Such service directory may also be provided with a pointer for each service, the pointer being arranged to point to the first unused password in the set of passwords and, after that password has been used, to move on or be incremented to then point to the next unused password in sequence.

In further accordance with the inventive system, the mechanism for ordering new passwords and for transmitting them between the server and the subscriber identity module may comprise or utilize the short-message service (SMS-PP service) of a GSM network.

Other objects and features of the present invention will become apparent from the following detailed description of the invention as applied to preferred embodiments thereof.

DETAILED DESCRIPTION OF THE CURRENTLY PREFERRED EMBODIMENTS

The invention has for its basis the provision in or to a terminal device in a data communication system—as for example a wired or mobile telephone set or apparatus—of an extra module, either physical or logical, implementing operative functionality that creates or inserts additional signals in the communication between the telephone apparatus and the server in conjunction with a connection setups signal or procedure related to a service, and/or additional fields and/or components or equivalent in the communication between the telephone apparatus and the server. An expendable password, required to obtain access to the service, is in accordance with the invention transmitted in these additional signals or fields or components. This password transmission is carried out automatically without user action or intervention or, indeed, awareness. The module registers or records each password that is used and therefore always knows which is the correct password to be used for each particular log-on. The user will find this type of service notably easier and less intrusive to use, but in respect of data security it provides substantially the same level of security as services in which the user must manually input the necessary password(s). The additional module is also able or operable to receive new passwords from the server and to order or initiate a request to the server for new passwords when necessary.

This module in the telephone apparatus may furthermore support simultaneous access to multiple services each requiring expendable passwords. For this purpose, the additional module of the invention may contain a directory of supported services—in short, a service directory—which is used to identify, in a user's attempt to initiate a remote access connection, that the attempted connection is to a service that requires expendable passwords and to locate the correct list of passwords for that service and, in addition, to locate the correct position in the password list so that the proper password is transmitted to the service for access.

The preferred embodiment of the inventive system comprises a mobile station, such as a GSM telephone, whose subscriber identity module (SIM) contains a software-based application that uses SIM Application Toolkit commands to accomplish and provide, in conjunction with an otherwise substantially-conventional GSM telephone or the like, the additional functionality provided in accordance with the invention, as for example described hereinabove. The password transmission mechanism employed in conjunction with the setup of a service connection between the SIM card and the remote server of the service provider uses, in a preferred embodiment, the called-subscriber number, i.e. the so-called B-identifier. The application on the SIM card uses the "Call Control by SIM" command as defined in the TS GSM 11.14 specification, and in practice the inventive application processes each called-subscriber number; in other words, it compares the called-subscriber number with the numbers stored in the service directory and, when it detects that a call is addressed to one of the stored numbers (i.e. one of the numbers associated with a service requiring a password to attain access), it appends to the end of the telephone number a required or predetermined number of additional digits in which the expendable password is encoded or otherwise represented. For example, when the user is making a call to the number 0800-XYZ-123456, and that number is identified by the inventive application as one present in the stored listing of numbers, the application on the SIM card will change the number to the form 0800-XYZ-123456-KLMN, which the last four digits (KLMN) of the modified number are or represent the expendable password that is added by the SIM card.

The service directory may be implemented as a special file on the SIM card. The special file contains information specifying the services supported, their identifier data and the names of the password files to be used in conjunction with the various supported services. Moreover, for each service, the service directory contains a pointer that points to the current position in the corresponding locally-stored list of passwords. Table 1 presents an example of the information elements that may be included in this special file.

With specific reference to Table 1, and by way of illustrative example, service 1 is identified in accordance with the invention from the fact that the user is calling the number 0800123. The application knows that it must append to the end of that number an expendable password, which password is found in the file 2FF5 that contains a total of 100 passwords. In this instance, and at this time, the current password to be used is the thirteenth one listed in the file 2FF5.

TABLE 1

Service directory as used in an embodiment of the invention

| Service Identifier | Method | Identifiers Associated With Method | Name of Password File | Pointer | Total Number of Passwords |
|---|---|---|---|---|---|
| 1 | BID | 0800123 | 2FF5 | 13 | 100 |
| 2 | BID | 0800456 | 2FF4 | 11 | 100 |
| 3 | SMS | SMSC:+02 0202800 BID:8756 | 2FF6 | 2 | 9 |

The server in the public telecommunication network thus receives the expendable password in the signaling data transmitted through the telephone network. The server takes the last four digits of the B-identifier and assumes that they constitute or provide an expendable password. The server then compares the expendable password thus obtained with its own information as to what should be the user's next password. This extraction of the password digits and comparison with its own stored date may be carried out by any currently-known or otherwise suitable methods.

If the particular service requires the use of a user name at log-on to the service, the service directory may additionally contain stored user names for each listed service. The user name may, for example, also be appended to the connection setup signal in the same manner as the password.

To effect the transmission of new passwords between the server and the inventive software-based application on the SIM card, the SMS-PP (short messaging) service of the GSM network may be employed. Transmission by the SIM card of an order for new passwords may be carried out using the SMS-PP/MO (Mobile Originated) service with the passwords then transmitted to the SIM card using the SMS/PP-MT service.

The functionality of the inventive application may be divided between three operative modules. The first module, an appending module, recognizes—as from the subscriber number used to access the service—the need to add an expendable password and sends a request to locate the password to a password search module. Once the search module has identified the proper or appropriate password, the appending module appends the expendable password that it has received to the B-identifier and allows the call to further proceed from the telephone apparatus.

In the most preferred embodiment of the invention, the third module, for adding new locally-stored passwords for use in accessing one or more remote services, operates completely independent of the other modules. In practice, it monitors the SMS Data Download traffic consistent with TS GSM 11.14 version 5.1.0 as received by the SIM card and detects the appearance of new passwords on the card. The module for adding new passwords stores the new passwords received in the SMS Data Download message to a suitable special file on the SIM card and enters an appropriate addition to the service directory to enable the search block to locate the new passwords. This new password file may comprise a combination that contains the last unused passwords of the previous file and the completely new passwords just received.

Those skilled in the art will appreciate that the various functions and operations performed by or at the user's terminal device are generally anticipated and intended for implementation in software operatively utilized in conjunction with otherwise substantially conventional hardware. Likewise, the server functionality required or appropriate to support and in accordance with the invention will generally be implemented in software at the server. In a GSM telecommunication system in which the terminal device comprises a mobile telephone handset, the software implementing the inventive terminal operations and functionality may in a preferred embodiment be carried or stored on the SIM (subscriber identity module) card associated or used with the mobile handset which may in other respects be of conventional construction. Although the invention may alternatively be practiced using dedicated hardware modules forming a part of the terminal device and constructed specifically for performing the respective operations that characterize the invention, in preferred forms of the inventive method and apparatus such functionality is implemented through programming or software that is operable to carry out those operations. In either case, the particular details and design of the hardware or software is substantially a matter of design choice and its construction and/or design is, given the within disclosure of the invention, considered to be well within the ordinary abilities of those skilled in the relevant arts. No specific disclosure of suggested construction or design details is accordingly provided herein or deemed necessary to enable ready practice of the invention.

Thus, while there have shown and described and pointed out fundamental novel features of the invention as applied to preferred embodiments thereof, it will be understood that various omissions and substitutions and changes in the form and details of the methods described and devices disclosed, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. In a data communication system in which a remote user of a service provided by a server on a network of the system is required to transmit to the server a valid expendable password, from a set of expendable passwords provided to the user, in order to obtain remote user-access to the service via the network, the improvement comprising a terminal device connected to the network for use by the user in remotely accessing the service via the network, said terminal device comprising:

storage means for storing at the terminal device the set of expendable passwords provided to the user for use in remotely accessing the service from the terminal device via the network;

selecting means for automatically selecting, from the stored set of expendable passwords at user log-on to the service, one of the stored passwords for use in remotely logging-on to the service from the terminal device; and adding means for automatically adding, to a connection setup signal to be transmitted from the terminal device to the server over the network to remotely log-on to the service from the terminal device of the user, the one of the stored passwords selected by said selecting means, wherein the network is a GSM network and said terminal device comprises a GSM mobile telephone, said terminal device further comprising a subscriber identity module that implements said selecting means and said adding means in software on said subscriber identity module, said software on the subscriber identity module further comprising means for identifying the service by a telephone number entered by the user at the terminal device to access the service, and said adding means further comprising means for appending, to the telephone number, a predetermined number of digits characterizing the one of the stored passwords selected by said selecting means.

2. In the data communication system of claim 1, wherein the server includes means for updating the single-use passwords stored at the terminal device by transmitting a new set of single-use passwords from the server to the terminal device via the network, said terminal device further comprising means for receiving a set of passwords from the server via the network.

3. In the data communication system of claim 1, said terminal device further comprising means for automatically ordering, from the server via the network, a new set of single-use passwords for use in logging-on to the service when each of the passwords stored at the terminal device has been used to remotely log-on to the service from the terminal device.

4. In the data communication system of claim 1, said storage means of said terminal device comprising means for storing a plurality of sets of single-use passwords, each said stored set of single-use passwords comprising a plurality of single-use passwords for use in remotely accessing a corresponding one of a plurality of services remotely-accessible by the user of the terminal device.

5. In the data communication system of claim 4, said selecting means comprising means for automatically selecting, from a one of the plurality of stored sets of single-use passwords for use with the corresponding one of the plural services to be accessed by the user, a one of the single-use passwords from said one set for use in logging-on to the corresponding one of the plural services.

6. In the data communication system of claim 1, wherein the network comprises a wired telecommunication network, and wherein said terminal device comprises a telephone set in the wired network.

7. In the data communication system of claim 1, said subscriber identity module further comprising a service directory storing information specifying a plurality of services accessible by the user of the terminal device, service identifier data for each of the accessible services, and password file names to be used in conjunction with remote user access to the plural services.

8. In the data communication system of claim 7, said service directory further comprising a pointer for each of the plural services and arranged to point to a first unused password in the set of passwords to be used to attain access to a corresponding service and to be updated to point to a sequentially-next unused password in the set of passwords for the corresponding service as each stored password is used to access the corresponding service.

9. In the data communication system of claim 1, said software on the subscriber identity module further comprising means for automatically ordering, from the server via the network using the short-message service (SMS-PP service) of the GSM network, a new set of single-use passwords for use in logging-on to the service when each of the passwords stored at the terminal device has been used to remotely log-on to the service from the terminal device, and for receiving the new set of single-use passwords transmitted from the server using the short-message service.

* * * * *